United States Patent [19]

Vargo

[11] Patent Number: 4,734,828
[45] Date of Patent: Mar. 29, 1988

[54] HIGH FREQUENCY-HIGH VOLTAGE POWER CONVERTER CIRCUIT

[76] Inventor: Frank J. Vargo, 5620 SW. Third Ct., Plantation, Fla. 33317

[21] Appl. No.: 42,973

[22] Filed: Apr. 27, 1987

[51] Int. Cl.$^4$ .......................................... H02M 7/537
[52] U.S. Cl. ....................................... 363/22; 363/133; 315/DIG. 7
[58] Field of Search .................. 363/22-23, 363/97, 133; 315/DIG. 2, DIG. 5, DIG. 7; 331/113 A

[56] References Cited

U.S. PATENT DOCUMENTS

| | | | |
|---|---|---|---|
| 3,112,435 | 11/1963 | Barney | 323/908 X |
| 3,582,733 | 6/1971 | Brubaker | 363/133 X |
| 4,007,413 | 2/1977 | Fisher et al. | 363/18 |

FOREIGN PATENT DOCUMENTS 0148681  9/1983  Japan ................................ 363/133

*Primary Examiner*—Peter S. Wong
*Attorney, Agent, or Firm*—Flehr, Hohbach, Test, Albritton & Herbert

[57] ABSTRACT

In one embodiment, the high frequency-high voltage power module includes an output transformer having a first primary winding and a first secondary winding and a second transformer, that is saturable, having a second primary winding and a second secondary winding. The AC power applied to the power module is converted to a substantially direct current by a diode, a capacitor and a thermistor. A center tap on the first primary winding is connected to the positive side of the capacitor. Either end of the first primary winding of the output transformer is connected to a respective end of the second primary winding of the second transformer via a respective resistor. The center tap on the second secondary winding is connected via an RC circuit to the negative side of the capacitor. A pair of switching transistors operates in a balanced push-pull relationship and is switched by the current flowing through the divided windings of the second secondary winding. The collector/emitter of a respective transistor is parallel to a feedback resistor, common to both transistors, to the converting capacitor and to one segment of the first primary winding. When the second transformer saturates, the voltages across the primary and secondary windings fall to zero, thereby switching an alternate one of the pair of transistors to an OFF state.

8 Claims, 7 Drawing Figures

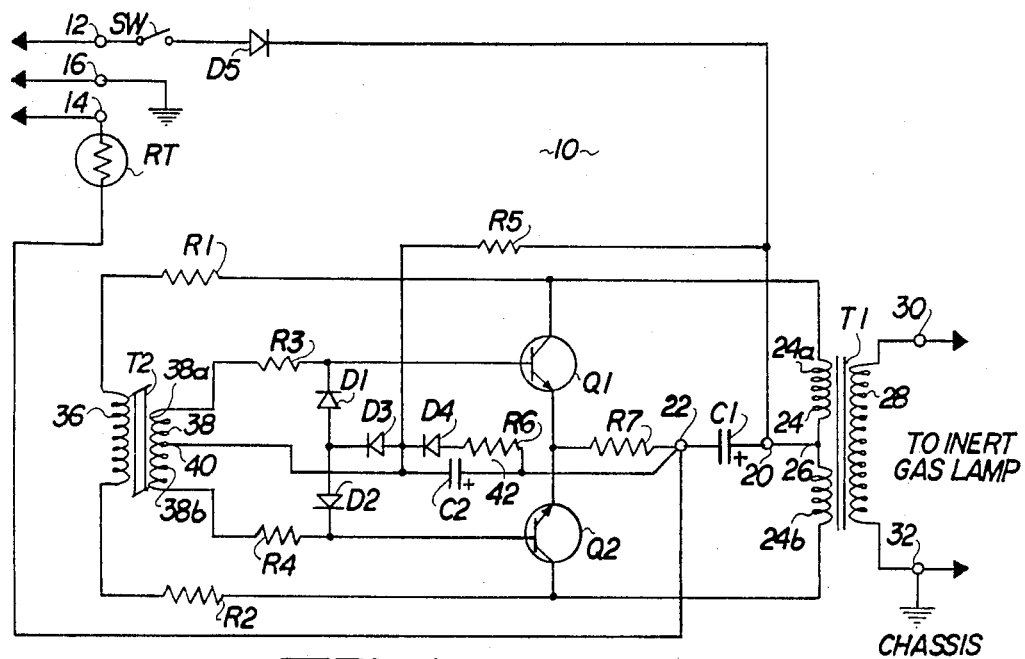
FIG. 1
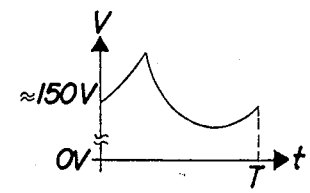
FIG. 2
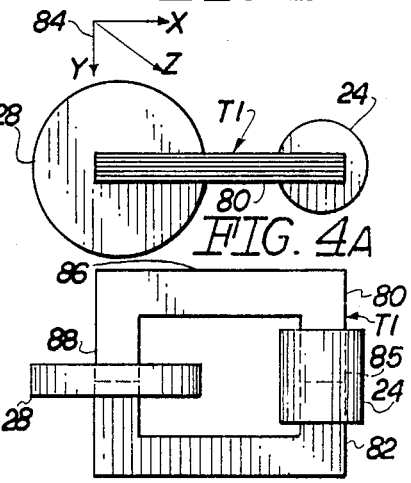
FIG. 4A
FIG. 4B
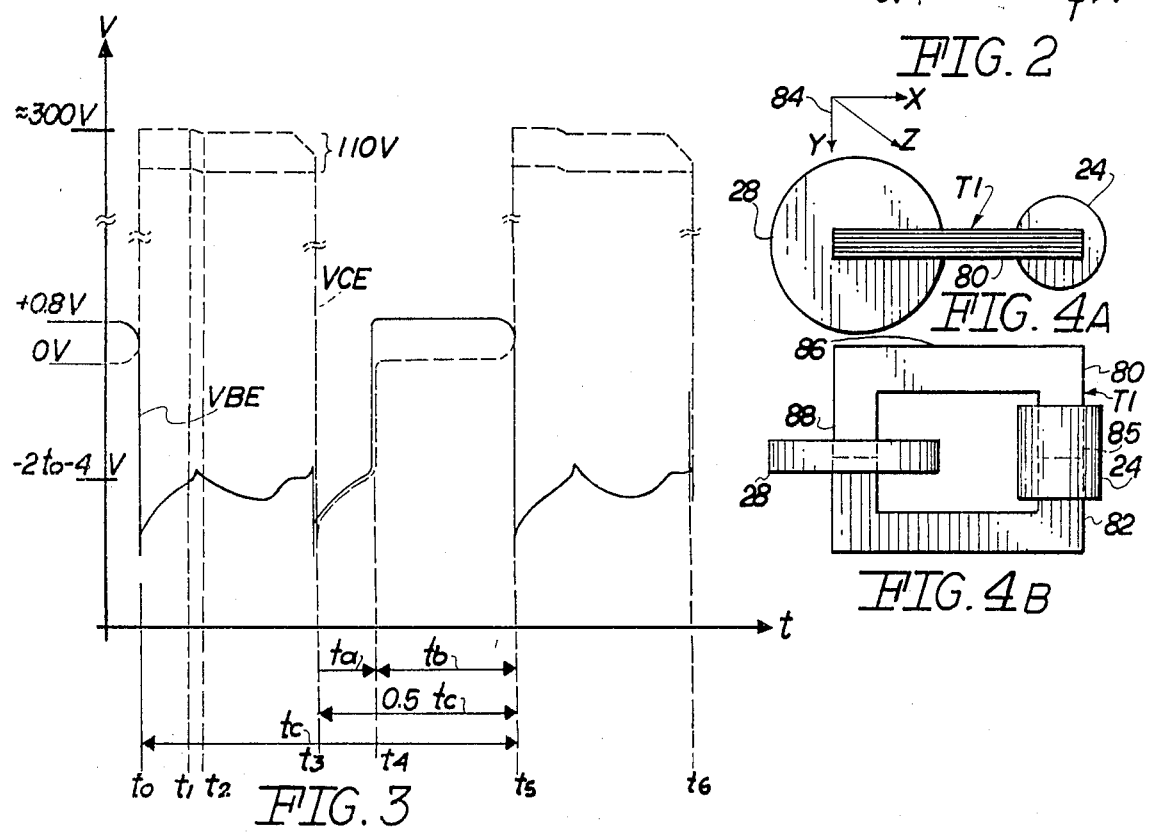
FIG. 3

4,734,828

HIGH FREQUENCY-HIGH VOLTAGE POWER CONVERTER CIRCUIT

BACKGROUND OF THE INVENTION

The present invention relates to a power module or power source and particularly relates to a power converter capable of producing high frequency-high voltage power from conventional alternating current (AC) electrical power.

There exists a need for producing high frequency-high voltage electrical power for various types of circuits. Particularly, inert gas lamps, i.e., neon lamps, when supplied with high frequency-high voltage power will benefit from the reduction in size and weight and from the added control features provided by the present invention.

For inert gas lamps utilized in conjunction with small and sometimes portable signs, displays or advertisements, a power module is necessary to convert the conventional AC electrical power into the high frequency-high voltage power to drive the lamp. A typical sign or display has a light skeleton-like, metal frame that holds the inert gas tubing in place. Prior art devices utilize a large, heavy, 60 cycle, high voltage transformer mounted at the bottom of the sign. A typical sign, without the transformer, weights approximately 6 pounds while the standard transformer weighs approximately 10 pounds.

A problem arises with the prior art signs in that the construction of the sign is much to fragile to support the weight of the transformer. As a consequence, a high percentage of signs arrive at their shipping destination with broken lamp tubing. Additional packing material placed around the transformer does not completely alleviate this shipping and handling problem.

OBJECT OF THE INVENTION

It is an object of the present invention to provide a power module for circuits utilizing high frequency-high voltage electrical power.

It is an additional object of the present invention to provide a power module for inert gas lamps.

It is a further object of the present invention to provide a power module that is small, light weight, and hence is particularly useful for small displays or signs.

It is an additional object of the present invention to provide a power module which is lighter than the conventional power module for inert gas lamps.

It is another object of the present invention to provide a power module whose output power level is adjustable.

It is a further object of the present invention to provide a power module utilizing a push-pull topology.

It is another object of the present invention to provide a power module which has a small number of circuit components.

SUMMARY OF THE INVENTION

In one embodiment, the high frequency-high voltage power module includes an output transformer having a first primary winding and a first secondary winding and a second transformer having a second primary winding and a second secondary winding. AC power is applied to the input terminals of the power module and that AC power is converted to a substantially direct current by way of a half-wave rectifier, a capacitor and a thermistor connected serially across the input terminals. The first primary winding of the output transformer has a center tap as its midpoint and the positive side of the capacitor of the AC to DC converter is connected to the center tap.

Each end of the first primary winding of the output transformer is connected to a respective end of the second primary winding of the second transformer via a respective resistive, impedance isolation circuit.

The second transformer is saturable and has a center tap dividing the second secondary winding thereof. The center tap of the second secondary winding is connected via an RC circuit to the negative side of the capacitor of the AC/DC conversion circuit.

A pair of switching transistors operates in a balanced push-pull relationship and is switched by the current flowing through the divided windings of the second secondary winding. The base of each transistor is coupled to the proper phase end of the second secondary winding via a respective impedance isolation resister. Additionally, a bias circuit is connected to the base of each switching transistor via the RC circuit. The emitter of each switching transistor is connected via a common feedback resister to the negative side of the capacitor of the AC/DC conversion circuit opposite the center tap of the first primary winding of the output transformer.

When the second transformer saturates, the voltages across the second primary and secondary winding fall to zero, thereby switching an alternate one of the pair of transistors to an OFF state. The capacitor, in the RC circuit, functions as a filter for the voltage pulse which would result from the total current through the resistor in the RC circuit. It also serves as a low impedance path for the larger, short duration reset current flowing through the respective segment of the first primary winding of the output transformer.

BRIEF DESCRIPTION OF THE DRAWINGS

Further objects and advantages of the present invention can be found in the following description of the preferred embodiments thereof when taken in conjunction with the accompanying drawings in which:

FIG. 1 shows the electrical schematic of the high frequency-high voltage power module conversion circuit in accordance with the principles of the present invention;

FIG. 2 shows a wave form as the substantially direct current obtained from the conversion circuit in one embodiment of the present invention;

FIG. 3 shows a timing diagram for one of the pair of switching transistors in accordance with the principles of the present invention;

FIGS. 4A and B are plan views of the top and side view, respectively of the output transformer utilized in one embodiment and developed in accordance with the principles of the present invention;

DETAILED DESCRIPTION OF THE PREFERRED EMBODIMENTS

Figure 5:
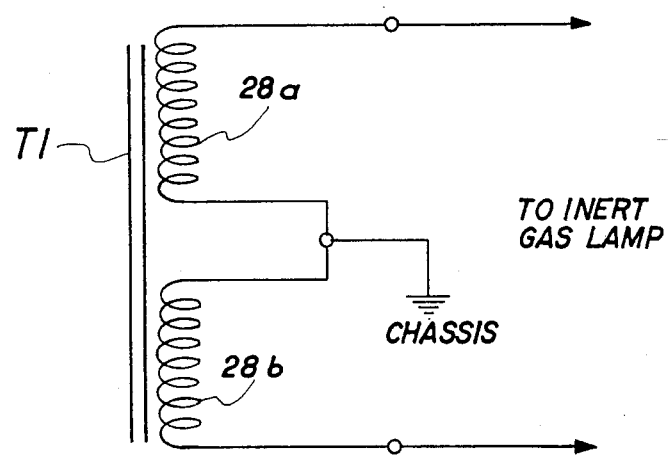
FIG. 5 shows an alternative circuit for the output of the principal transformer for the converter; and, FIG. 6 is a plan view of an alternative output transformer.

The present invention relates to a power source circuit, a power module or a conversion circuit that generates high frequency-high voltage power. The conversion circuit or power module is useful for supplying electrical power to inert gas lamps.

FIG. 1 shows the electrical schematic for one embodiment of power module 10 in accordance with the principles of the present invention. Input terminals 12 and 14, in this embodiment, receive conventional, 60 cycle, AC electrical power. Terminal 16 is connected to earth ground and the chassis of the power module. Switch SW controls the operation of the circuit.

Power module or conversion circuit 10 includes a means for converting the AC power to a substantially direct current. This AC/DC power conversion utilizes a half-wave rectifier, embodied by diode D5, capacitor C1 and resister $R_T$. In this embodiment, resister $R_T$ is a thermistor which has a negative temperature coefficient. That means that the resistance of the thermistor is inversely proportional to the temperature of the resistor and hence the circuit.

Thermistor $R_T$ provides current limiting protection for power module 10 during the initial turn ON or start up of circuit by preventing surge current from damaging the circuitry. During operation, the resistance of thermistor $R_T$ is reduced due to its negative temperature coefficient characteristic.

The AC/DC conversion circuit (diode D5, capacitor C1 and resistor $R_T$) is connected in a serial fashion across input terminals 12 and 14 of power module.

FIG. 2 shows a wave form diagram of the voltage at junction 20 (the positive side of capacitor C1), with respect to junction 22 (the negative side of capacitor C1), in the AC/DC conversion circuit. Approximately one cycle T is shown which corresponds to the frequency of the AC electrical power applied to input terminals 12 and 14. The average voltage at junction 20 is approximately 150 volts under the conditions shown. In FIG. 2, the input voltage is 120 VAC and T equals 1/60 sec.

Power module 10 includes two transformers, an output transformer T1 and a saturable core transformer T2. Output transformer T1 has its primary winding 24 dividing into winding segments 24a and 24b by center tap 26 disposed at the electrical center of the primary winding. The primary consists of a dual winding, on a coil tube, which is bifilar wound to produce identical characteristics and maximum coupling between the two winding segments. Secondary winding 28 of transformer T1 is connected in this embodiment to an inert gas lamp via output terminals 30 and 32. Secondary winding 28 of transformer T1 may be either a single pi winding, with one end connected to ground terminal 16 (see FIG. 1) or, for higher output voltage, a dual pi winding with its electrical center connected to ground terminal 16 (see FIG. 5). All pi windings are wound in a universal or lattice pattern to ensure proper operation at high frequency.

FIGS. 4A and 4B respectively show detailed, plan views of the side and the top of output transformer T1. Table I that follows provides the dimensions for one-half or a "C" portion of the ferrite core for the output transformer.

TABLE I

|  | U core<br># 1F19 | Stackpole<br># 50-0386 |
|---|---|---|
| Height | 2.543 | 2.476 |
| Width | 0.545 | 0.545 |
| Height of Arm | 0.545 | 0.515 |
| Length of Arm | 0.703 | 0.703 |
| Length of Vertical | 0.453 | 0.453 |

TABLE I-continued

|  | U core<br># 1F19 | Stackpole<br># 50-0386 |
|---|---|---|
| Leg |  |  |
| Space between Arms | 1.457 | 1.455 |

As stated earlier, the dimensions provided in Table I are for a "C" shape of the core which is two "C" shapes placed end to end. FIG. 4B shows "C" shaped core portion 80 having the extensive end 85 of an arm adjacent the extensive end of another arm of core section 82. The height of the "C" section 80 is given in Table I as the dimension along axis x as shown in coordinate system 84 immediately below the plan view of transformer T1. The width is along axis z, height of the arm is along axis x, length of the arm is the extensive portion 85 of the arm and is measured from body portion 86 along the y axis, length of the vertical leg is measured along axis y for body portion 86 and the space between arms 85 and 88 is measured along axis x. While only two types of ferrite cores are shown in Table I, the design of the power module can easily accommodate other ferrite cores having similar or proportional characteristics.

Figure 6:
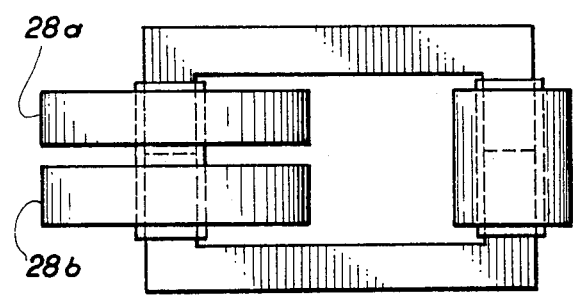

The number of turns in primary winding 24 depends in part, upon maximum voltage present at circuit junction 20, the positive side of capacitor C1 in FIG. 1. The size of the wire depends upon the RMS current in either primary winding segment under maximum load conditions. Hence with other factors held constant, the number of turns on primary winding 24 depends on the input voltage across input terminals 12 and 14. The characteristics of secondary winding 28 at the other end of the assembled core depend upon the power requirements of the associated circuit coupled to output terminals 30 and 32. The number of turns in secondary winding 28 depends primarily upon the output voltage requirements of the power module and the number of turns on the primary winding. It is estimated that to obtain a 6 Kv peak output at 120 VAC input using either of the cores shown in Table I requires approximately 2500 turns on the secondary winding at a chosen operating frequency. The shown configuration utilizes a single Pi as the secondary winding. However, a two Pi secondary winding could be utilized and the center tap at the electrical center of that secondary winding would be grounded as shown in FIG. 5. This would approximately double the voltage output of the power module. Both of these configurations are meant to be encompassed by the claims appended hereto. It is important that the two pi windings, 28a and 28b shown in FIGS. 5 and 6, be spaced apart, as shown in FIG. 6, in order to reduce the total inductance of secondary winding 28 and allow full power to build up during each cycle.

FIG. 4A simply shows the top plan view of output transformer T1 wherein primary winding 24 and secondary winding 28 is shown on core section 80.

Returning to the detailed description of the electrical schematic of power module 10, a respective end of the primary winding of the output transformer T1 is connected to a respective collector of an alternate one of the switching transistor Q1 and Q2, a respective impedance circuit embodied by either of resisters R1 or R2, and ultimately to a respective end of the primary winding 36 of saturable core transformer T2.

Transformer T2 provides the dual circuit function to operate as an impedance changing device (transformer) and as a timing device (saturable inductor). It includes a ferrite core which has magnetic square loop characteristics. In one embodiment, transformer T2 is a toroid with a primary having 125 turns and a secondary having 4 turns. As is well known, this turns ratio will vary dependent upon the voltage ratio determined by its primary and secondary interface requirements. In this embodiment, the primary is wound almost 360 degrees around the toroid and the secondary is wound on the remaining circumferential region of the toroid. The size of the core of transformer T2 is related to the power output of power module 10 and the current necessary to drive switching transistors Q1 and Q2. The resistance ratio of resistors R1 and R2 with respect to resistors R3 and R4 generally follow the impedance ratio of T2 primary with respect to T2 secondary.

All of these resistors, R1, R2, R3, and R4, provide proper isolation impedance circuits for the voltage feedback from the primary of output transformer T1 (resistors R1 and R2) and isolation impedance from the base input circuit of each of the switching transistors Q1 and Q2 (resistors R3 and R4, respectively). By appropriately designing saturable transformer T2 and selecting the values of resistors R1, R2, R3, and R4, the basic switching frequency of the power module is determined. As in all feedback control loops, proper phasing is necessary in the connections to T2 primary and secondary.

Resistors R3 and R4 are respectively connected to either end of secondary winding 38 of transformer T2. Secondary winding 38 is divided in half by center tap 40.

Center tap 40 is connected to an RC circuit 42 that includes resistor R6, capacitor C2 and diode D4. The other end of RC circuit 42 is connected to circuit junction 22 which is the negative side of capacitor C1.

A biasing network, for each of the switching transistors Q1 and Q2, sets the minimum negative base bias voltage during its normal "OFF" period of the cycle. The biasing networks include diodes D1, D3 and D4 for transistor Q1 and diodes D2, D3 and D4 for transistor Q2. The biasing network is connected to RC circuit 42 as well as being connected to the base of the respective transistor. D4 also provides the necessary DC isolation so that "start up" current, from C1(+) through R5 to either transistor, will not be shunted to C1(−) during the initial "start up" period.

The emitter of each switching transistor Q1 and Q2 is connected to the negative side of capacitor C1 via feedback resistor R7.

Resistor R5 is only utilized to provide initial "startup" current from the positive side of capacitor C1 through R5 to both of the transistor bases.

The operation of power module 10 will be explained in conjunction with timing diagram illustrated in FIG. 3 that shows 1½ cycles from time $t_0$ through time $t_6$ for one of the switching transistors. In the following discussion, transistor Q1 will be discussed in detail. It should be noted that the operation of transistor Q2 is a mirror image of the operation of transistor Q1 since the power module circuit is a balanced, push-pull converter. Precisely, the operation of transistor Q2 is 180 degrees out of phase with respect to the operation of transistor Q1. As discussed herein, the end of a winding and particularly the end of one of the split windings is that end opposite the center tap. For example, an end of primary winding 24 is the end of the winding segment 24a opposite center tap 26. Likewise, the end of winding segment 38a for transformer T2 is that end of the segment opposite from center tap 40.

Referring concurrently to FIGS. 1 and 3, at time $t_0$, the base-emitter voltage ($V_{be}$) is negative and in this embodiment it is more negative than −2 to −4 volt bias level shown. The collector-emitter voltage ($V_{ce}$) is shown in dashed lines in FIG. 3. It is important to note that the ordinate scale in FIG. 3 varies significantly since the upper region of FIG. 3 is approximately 300 volts whereas the lower region in FIG. 3 (below the broken line indicators) is in the region surrounding zero volts.

At time $t_0$, the collector voltage $V_{ce}$ is very high and approaches 340 volt peak. The upper end of the collector voltage $V_{ce}$ varies as shown in band 110 due to the change in voltage of the AC/DC voltage conversion. In other words, the substantially DC voltage varies as shown by the wave form in FIG. 2. At the peak DC voltage, the collector voltage $V_{ce}$ is in the upper end of range 110 whereas when the DC voltage is lowest, the collector voltage is in the lower end of region 110. In one embodiment, region 110 spans 60 volts. Again, it is important to note that the voltage scale in FIG. 3 changes if one is considering the lower voltages present at the base emitter junction of the switch transistor as compared to the higher voltages at the collector when the transistor is in an OFF state.

Therefore, at time $t_0$, approximately 300 volts is present at the collector of transistor Q1 when the transistor is in an OFF state. That same voltage is present at the end of winding segment 24a the primary winding of output transformer T1. The voltage at circuit junction 20 is nominally 150 volts positive. At this time, the voltage at the other end of primary winding 24, that end of winding segment 24b opposite center tap 26, is approximately zero volts or less.

Vce is approximately 4 to 8 volts higher than at $t_2$ due to the excess energy remaining in the primary winding 24 of output transformer T1 when Q1 is turned OFF. Simultaneously, the collector voltage Vce of Q2, due to magnetic coupling in the primary winding of T1, is driven approximately 4 to 8 volts negative causing the collector-base n-p junction of Q2 to turn ON during this period of time. This conduction path removes the excess energy remaining in the primary winding. During the very small interval of time between $t_1$ and $t_2$, Q2 collector-base n-p junction turns OFF and the base-emitter p-n junction turns ON. This allows normal Q2 collector current to flow for the period of time between $t_2$ and $t_3$.

At time $t_3$, transformer T2 saturates and all voltages across T2 windings drop to 0 volts (or substantially 0 volts). At that time, Q2 base voltage $V_{be}$ drops to 0 volts, Q2 collector is released and its Vce voltage instantaneously rises to approximately 300 volts. Simultaneously, Q1 collector Vce voltage drops from substantially 300 volts to less than 0 volts. This switching of the collector voltages simultaneously causes the T2 primary and secondary voltages to switch, due to coupling thru R1 and R2, and take T2 out of saturation. The switching action just described, would normally cause the $V_{be}$ voltage, from T2 winding 38a, to turn Q1 ON at time $t_3$. However, due to the excess energy remaining in winding 24 of output transformer T1, the Q1 collector voltage and hence the base voltage, remain below 0 volts for time span $t_a$ (between times $t_3$ and $t_4$).

This voltage pulse is filtered by capacitor C2 in the RC circuit 42. This is shown by the time constant characteristic of the base and collector voltages during interval $t_a$. The current reset pulse, during that time interval, utilizes current from the excess energy stored in winding 24 that passes through the Q1 collector-base n-p junction and through diodes D1, D3 and R-C network 42 to the negative side of capacitor C1. When the excess energy, minus losses, has been transferred to C1 and C2, the reset current stops allowing the Q1 collector-base n-p junction to turn OFF and the base-emitter p-n junction to turn ON, at time $t_4$, due to the $V_{be}$ voltage from T2 winding 38a. This $V_{be}$ voltage is shown as approximately 0.8 volts at the base-emitter p-n junction. At this time, the collector $V_{ce}$ voltage is substantially zero volts, $V_{be}$ voltage is substantially 0.8 volts, and both $V_{be}$ and $V_{ce}$ remain at these levels during time span $t_4-t_5$. Diodes D1, D3 and D4 set the minimum negative bias for the base voltage $V_{be}$ during the OFF state of transistor Q1 or between times $t_0$ and $t_3$.

Interval $t_a$ is called the reset interval and interval $t_b$ (between times $t_4$ and $t_5$) sets the current pulse width for the entire switching cycle.

At time $t_5$, transformer T2 again saturates, transistor Q1 turns OFF, transistor Q2 turns ON and the collector of transistor Q1 is released such that its voltage $V_{ce}$ rises to approximately 300 volts again.

By changing the value of resistor R6 in RC circuit 42, the negative bias voltage for either of the switching transistors is changed in proportion to total current through that resistor. This total current in part consists of a short duration reset current pulse during time interval $t_a$, or $t_0-t_1$, which is required to reset the core of output transformer T1 immediately after each half cycle (between times $t_0-t_3$ or $t_3-t_5$). The total current also consists of the base drive current from the other winding segment of the secondary winding of transformer T2 to the other switching transistor which is in an ON state. An increase in the negative bias voltage (for example the bias voltage for transistor Q1), will reduce the base drive current (for transistor Q2) available to keep transistor Q2 ON since that current is available from winding segment 38b of transformer T2. The increase in negative bias voltage causes a reduction in the pulse width (during interval $t_b$) thereby reducing the operating power level of the power module. Therefore, resistor R6 may be used to control, within limits, the power level of the entire module.

As stated earlier, capacitor C2 functions as both a filter for the voltage pulse, which results from the current through resistor R6 and together with diodes D1, D2 and D3, serves as a low impedance path for the larger, short duration reset current.

By shortening the ON time during interval $t_b$, the overall frequency of the output voltage, that is cycle time $t_c$, changes. In Table II that follows, switching transistors Q1 and Q2 are Motorola transistors, Model Number MJE13005. These transistors were utilized by supplying an AC power at 120 volts at input terminals 12 and 14. As shown, the resistance R6 was changed from 0 to 10 ohms.

TABLE II

|  | R6 = 0 | R6 = 10 ohms |
|---|---|---|
| $t_a$ | 5 microsec. | 5 microsec. |
| $t_b$ | 9 microsec. | 6.5 microsec. |
| $t_c$ | 28 microsec. | 23 microsec. |
| $V_{be}$ | −2 v. | −4 v. |

Feedback resistor R7 is connected to the emitters of both switching transistors Q1 and Q2. Resistor R7 utilizes the current gain characteristics of the switching transistors to provide a negative feedback which is useful for several purposes. This feedback increases the base input impedance of each transistor thereby allowing the use of resistors R3 and R4 to provide the necessary isolation impedance for transformer T2. The negative feedback tends to linearize the current through the switching transistors and reduces the need to match transistor characteristics. Further, the feedback provides some degree of current limiting for each transistor by increasing the negative bias during current surges and forcing a reduction in the pulse width or the duration of interval $t_b$.

As stated earlier, output transformer T1 utilizes two C shaped ferrite cores butted together to form a closed magnetic loop with primary and secondary windings spaced along the loop. Primary winding 24, consists of a dual winding on a coil tube that is bifilar wound to produce identical characteristics and maximum coupling between winding segments 24a and 24b. This primary winding is mounted on one leg of the core. The high voltage secondary winding 28 is wound on a separate coil tube and is mounted on the opposite leg of the core from the primary. By this construction, a high frequency square wave voltage, generated in primary winding 24 by the substantially instantaneous switching of transistors Q1 and Q2, is changed to a high voltage quasi-sine wave output at output terminals 30 and 32. This feature of the high impedance transformer having loosely coupled coils reduces the conducted and radiated high frequency noise on the output lines to the inert gas lamp. The lamp is utilized in conjunction with the present embodiment of the power module. For safety reasons, one end of the secondary (terminal 32) is connected to the metal chasis that surrounds the entire power module. In other words, power module 10 is placed in a metal box and the metal box is earth grounded through terminal 16 and terminal 32. All the components within the circuit are painted black and the interior of the box is painted black to fully disipate the heat generated by the circuit components.

It should be noted that a full wave rectifier could be used rather than the half wave rectification of diode D5. A full wave rectifier would obtain more power for the output, but would also dissipate more heat. In the embodiment described herein, the circuit outputs 6 Kv at 36-43 KHz.

A voltage feedback from output transformer T1 through resistors R1 and R2 to the primary of transformer T2 could be derived from taps placed on primary winding 24 of output transformer T1 or from a separate isolated winding on the primary of transformer T1. Although these options would increase the cost of the power module, they may be desired for better control of the voltage. Resistor R6 could be changed to an active element such as a transistor or integrated circuit and by applying the proper feedback from transformer T1, the power module could be made to function as a pulse width modulated power module.

The claims appended hereto are meant to cover modifications and changes within the scope and spirit of the present invention.

What I claim is:

1. A power supply for powering an inert gas lamp, comprising:
   conversion means, coupled to an a.c. power supply, for generating substantially d.c. output; and transformation means, having an input coupled to said conversion means and an output to be coupled to an inert gas lamp, for providing to the inert gas lamp a high frequency a.c. voltage having a frequency of at least 25 kilohertz and a voltage of at least 2000 volts, the magnitude of said voltage corresponding to the voltage supplied by said conversion means;

said transformer means including an output transformer having a first primary winding with a center tap coupled to said d.c. output of said conversion means and a secondary winding that is to be coupled to the inert gas lamp, and switching means coupled to said d.c. output of said conversion means for supplying an alternating current to said primary winding of said output transformer, said alternating current varying in polarity at a frequency of at least 25 kilohertz.

2. The power supply of claim 1, wherein said output transformer is sized so that the weight of said output transformer is substantially less than the weight of a transformer for directly transforming a 60 hertz a.c. power supply to produce similar output voltage and power levels as said power supply.

3. The power supply of claim 1, wherein the inert gas lamp is a neon lamp, and wherein said output transformer provides at least 2500 volts when said d.c. output from said conversion means is at least 60 volts.

4. The power supply of claim 1, wherein said primary and secondary windings of said output transformer are loosely coupled and said secondary winding comprises at least one pi winding.

5. An inert gas lamp, comprising:

an inert gas bulb having a pair of electrodes for supplying power to said bulb;

conversion means, coupled to an a.c. power supply, for generating substantially d.c. output; and transformation means, having an input coupled to said conversion means and an output coupled to said pair of electrodes of said inert gas bulb, for providing to said inert gas bulb a high frequency a.c. voltage having a frequency of at least 25 kilohertz and a voltage corresponding to the voltage supplied by said conversion means;

said transformer means including an output transformer having a first primary winding with a center tap coupled to said d.c. output of said conversion means and a secondary winding coupled to said pair of electrodes of said inert gas bulb, and switching means coupled to said d.c. output of said conversion means for supplying an alternating current to said primary winding of said output transformer, said alternating current varying in polarity at a frequency of at least 25 kilohertz.

6. The power supply of claim 5, wherein said output transformer is sized so that the weight of said output transformer is substantially less than the weight of a transformer for directly transforming a 60 hertz a.c. power supply to produce similar output voltage and power levels as said power supply.

7. The power supply of claim 6, wherein the inert gas bulb is a neon gas bulb.

8. The power supply of claim 6, wherein said primary and secondary windings of said output transformer are loosely coupled and said secondary winding comprises at least one pi winding.

* * * * *